(12) United States Patent
Gieras et al.

(10) Patent No.: US 9,638,044 B2
(45) Date of Patent: May 2, 2017

(54) RESISTIVE-INDUCTIVE PROPELLER BLADE DE-ICING SYSTEM INCLUDING CONTACTLESS POWER SUPPLY

(71) Applicant: Hamilton Sundstrand Corporation, Windsor Locks, CT (US)

(72) Inventors: Jacek F. Gieras, Glastonbury, CT (US); Lubomir A. Ribarov, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 549 days.

(21) Appl. No.: 14/203,813

(22) Filed: Mar. 11, 2014

(65) Prior Publication Data
US 2015/0260047 A1    Sep. 17, 2015

(51) Int. Cl.
| | |
|---|---|
| B63H 1/14 | (2006.01) |
| F01D 5/18 | (2006.01) |
| B64D 15/12 | (2006.01) |
| H05B 6/10 | (2006.01) |
| H05B 1/02 | (2006.01) |
| B64C 11/00 | (2006.01) |

(52) U.S. Cl.
CPC .............. *F01D 5/18* (2013.01); *B64D 15/12* (2013.01); *H05B 1/0236* (2013.01); *H05B 6/105* (2013.01); *B64C 11/00* (2013.01); *H05B 2214/02* (2013.01)

(58) Field of Classification Search
CPC . F01D 5/18; B64D 15/12; B64C 11/00; H01F 38/14; H05B 1/0236; H05B 2214/02

USPC ........................................................... 416/95
See application file for complete search history.

(56) References Cited

U.S. PATENT DOCUMENTS

| | | | | |
|---|---|---|---|---|
| 2,742,248 | A * | 4/1956 | Le Compte ............ | B64D 15/12 219/201 |
| 2,743,890 | A * | 5/1956 | La Rue .................. | B64D 15/12 219/202 |
| 2,757,273 | A * | 7/1956 | Taylor .................... | B64D 15/12 219/528 |

(Continued)

FOREIGN PATENT DOCUMENTS

| | | |
|---|---|---|
| EP | 2292514 A2 | 3/2011 |
| GB | 2293522 A | 3/1996 |

(Continued)

OTHER PUBLICATIONS

European Search Report; European Application No. 15150845.4-1808; Date of Mailing: Jul. 10, 2015; 9 pages.
Stopperan, "Understanding Etched-foil Heaters", Machine Design, pp. 54-58, Sep. 20, 2012.

*Primary Examiner* — Jessica Cahill
(74) *Attorney, Agent, or Firm* — Cantor Colburn LLP

(57) ABSTRACT

An aircraft propeller de-icing system comprises at least one propeller blade coupled to a rotatable prop assembly. The prop assembly is configured to rotate in response to rotatably driving a propeller shaft. At least one resistive-inductive heating unit is coupled to the at least one propeller blade. The resistive-inductive heating unit is configured to generate eddy currents that induce inductive heat in response to an electric current. A contactless power transfer system generates the electrical current in response to transferring power across an air gap separating the propeller shaft from the contactless power transfer system.

14 Claims, 14 Drawing Sheets

(56) References Cited

U.S. PATENT DOCUMENTS

| | | | | |
|---|---|---|---|---|
| 3,002,718 | A * | 10/1961 | Hackenberger, Jr. | B64D 15/12 244/134 R |
| 3,042,346 | A * | 7/1962 | Hawley | B64D 15/12 174/69 |
| 3,420,476 | A * | 1/1969 | Schultz | B64D 15/12 244/134 D |
| 5,483,791 | A | 1/1996 | Kotwal et al. | |
| 6,069,341 | A | 5/2000 | Gage et al. | |
| 6,137,082 | A | 10/2000 | Pruden et al. | |
| 6,181,235 | B1 * | 1/2001 | Smith | B64D 15/12 219/483 |
| 6,753,513 | B2 | 6/2004 | Goldberg et al. | |
| 2004/0080234 | A1 * | 4/2004 | Arel | B64D 15/12 310/261.1 |
| 2008/0251642 | A1 * | 10/2008 | Boschet | B64D 15/12 244/134 D |
| 2010/0038475 | A1 * | 2/2010 | Zecca | B64D 15/12 244/1 N |
| 2010/0065541 | A1 | 3/2010 | Henze | |
| 2011/0049300 | A1 * | 3/2011 | Safai | B64D 15/12 244/134 D |
| 2013/0039759 | A1 | 2/2013 | Perkinson | |
| 2014/0319278 | A1 * | 10/2014 | Ribarov | B64D 15/12 244/134 D |

FOREIGN PATENT DOCUMENTS

| | | | |
|---|---|---|---|
| JP | 2001278195 A | 10/2001 | |
| WO | 03078248 A1 | 9/2003 | |
| WO | 2011154645 A1 | 12/2011 | |

* cited by examiner

RESISTIVE-INDUCTIVE PROPELLER BLADE DE-ICING SYSTEM INCLUDING CONTACTLESS POWER SUPPLY

BACKGROUND OF THE INVENTION

Icing of aircraft propeller blades during adverse ambient flight conditions is known to occur. Ice formation and accumulation on the propeller blades may cause degraded component and/or system performance. Shearing of accumulated ice may also be entrained in the free stream flow and may damage aircraft components in the downstream path of the flying ice fragment(s). Such damage may incapacitate various systems and/or damage aircraft components.

Conventional methods for de-icing flight control surfaces are based only on electrical resistive heating (i.e., a joule heating process). Resistive heating techniques, however, typically consume large amounts of power while providing poor thermal transfer efficiency.

BRIEF DESCRIPTION OF THE INVENTION

According to at least one embodiment, an aircraft propeller de-icing system comprises at least one propeller blade coupled to a rotatable prop assembly. The prop assembly is configured to rotate in response to rotatably driving a propeller shaft. At least one resistive-inductive heating unit is coupled to the at least one propeller blade. The resistive-inductive heating unit is configured to generate eddy currents that induce inductive heat in response to an electric current. A contactless power transfer system generates the electrical current in response to transferring power across an air gap separating the propeller shaft from the contactless power transfer system.

According to another embodiment, a resistive-inductive heating unit configured to de-ice at least one aircraft propeller blade comprises a current conducting element disposed on the propeller blade. A first insulating element is disposed on the current conducting element. At least two pairs of resistive-inductive elements are disposed on the first insulating element. A second insulating element is disposed on the at least two pairs of resistive-inductive elements. Each pair of resistive-inductive elements is interposed between the first and second insulating elements, and is electrically insulated from the current conducting element. Each pair of resistive-inductive elements generates an electromagnetic field in response to an electrical current. The electromagnetic field induces eddy currents in the current conducing element to generate inductive heat that heats the at least one aircraft propeller blade.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
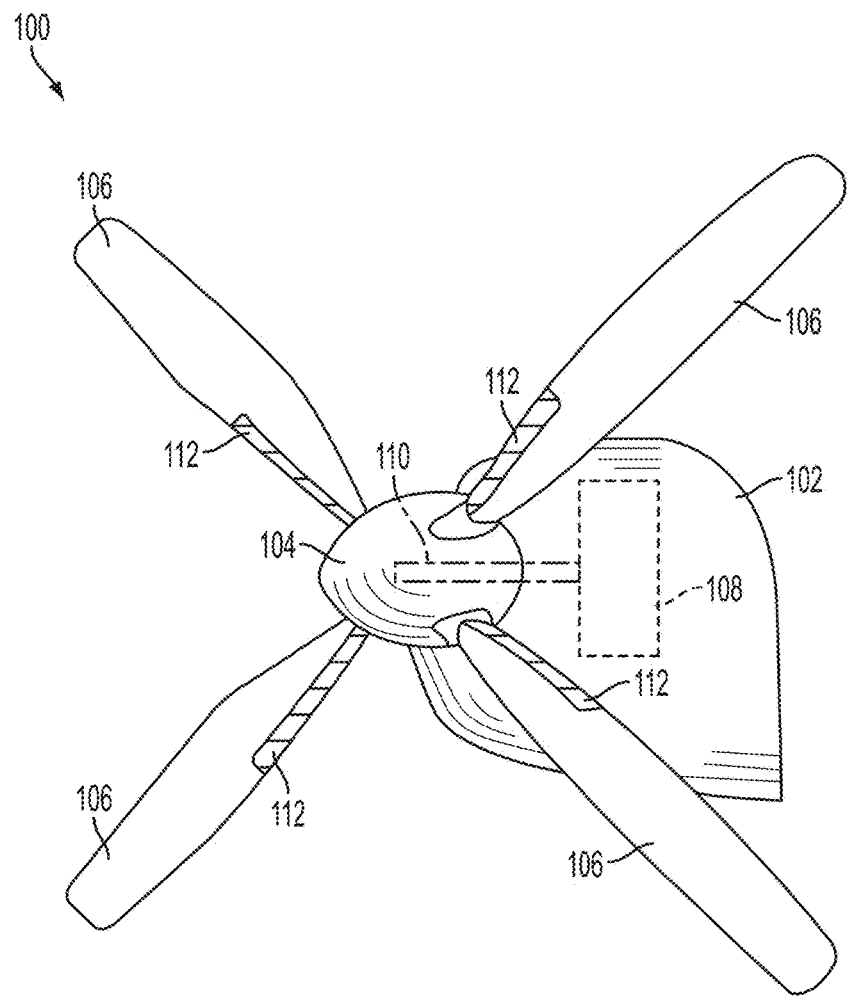
FIG. 1 illustrates an aircraft propeller assembly according to an embodiment.

Referring to FIG. 1, an aircraft propeller assembly 100 is illustrated according to an embodiment. The aircraft propeller assembly 100 includes an engine housing 102, a prop assembly 104, and a plurality of propeller blade 106. The engine housing 102 may contain an engine system 108 that drives the prop assembly 104 via a propeller shaft 110 as understood by one of ordinary skill in the art. The propeller blades 106 are coupled to the prop assembly 104 and extend radially therefrom. The propeller blades 106 spin along with the prop assembly 104 as the engine system 108 drives the propeller shaft 110.

The aircraft propeller assembly 100 further includes one or more resistive-inductive (RL) heating units 112 coupled to at least one of the propeller blades 106. Unlike conventional resistive heat units that release heat only in response to electric current flowing through a resistive element (i.e., a joule heating process), the RL heating units 112 are configured to generate both resistive heat and inductive heat. The inductive heat occurs in response to generating an alternating current (AC) electromagnetic field that induces eddy currents in an electrically conductive material.

According to at least one embodiment, each propeller blade 106 includes a respective RL heating unit 112 coupled thereto. Although FIG. 1 illustrates the RL heating units 112 disposed at a leading edge portion of a respective propeller blade 106, it is appreciated that the RL heating units 112 may be disposed at other locations of a respective propeller 106, or may entirely cover a respective propeller blade 106. Both the resistive heat and the inductive heat are transferred to the propeller blades 106 to promote de-icing of a respective propeller blade 106 as discussed in greater detail below.

Figure 2:
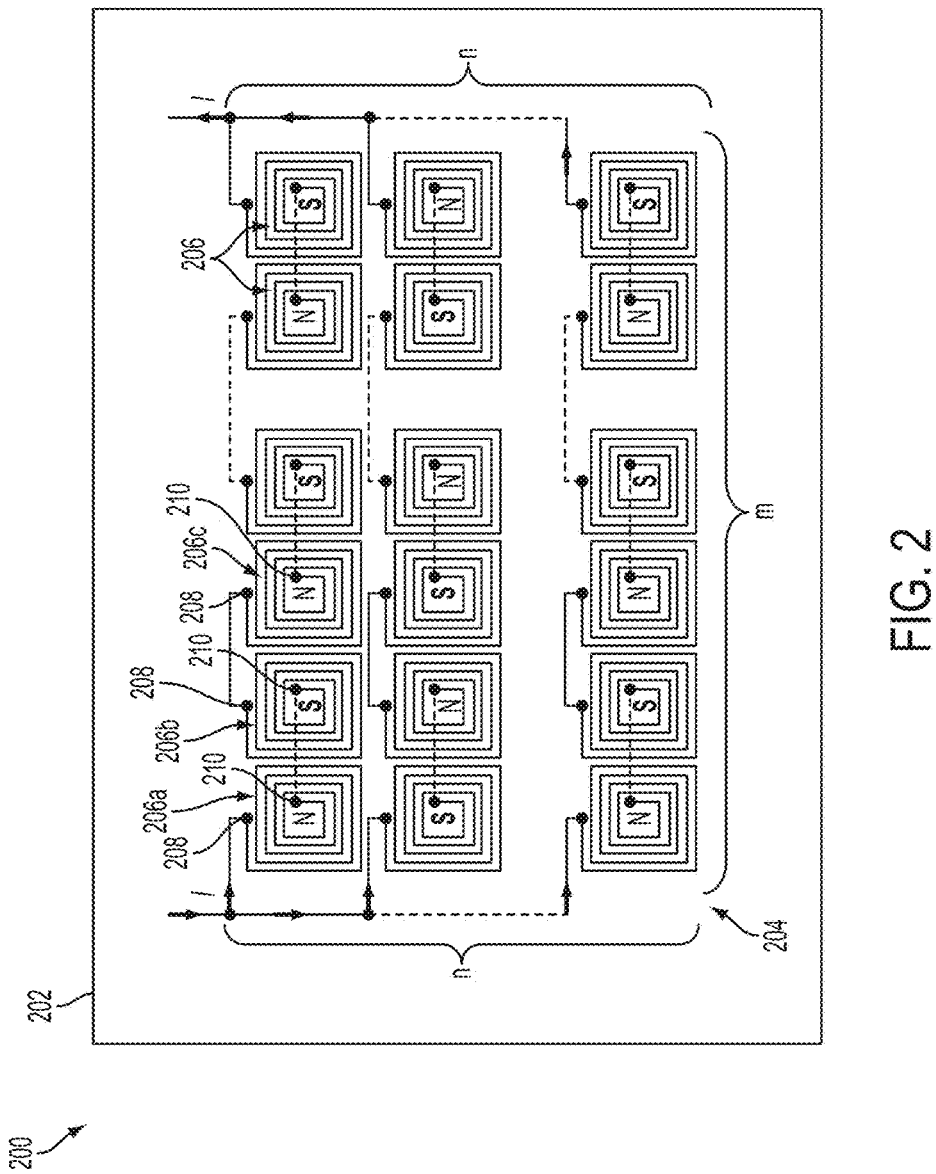
FIG. 2 illustrates a top view of a resistive-inductive heating unit according to an embodiment.

Referring now to FIG. 2, an RL heating unit 200 is illustrated according to at least one embodiment. The RL heating unit 200 comprises a substrate 202 including a matrix 204 of individual resistive-inductive heating elements 206, referred to hereinafter as RL elements 206. The matrix 204 of RL elements 206 may be formed according to various fabrication methods including, but not limited to, stamping and photolithography.

One or more RL heating units 200 may be disposed on one or more portions of a propeller blade. In one embodiment, the matrix 204 of RL elements 206 is disposed on a thin, flexible substrate. The thickness of the substrate 202 may be, for example, approximately 0.0005 inches (in) (i.e., approximately 0.0127 millimeters). The substrate 202 may include, for example, a flexible foil mesh that may conform to one or more portions of a propeller blade.

According to one embodiment, the matrix 204 comprises m×n RL elements 206. In one embodiment, the matrix 204 includes a plurality of RL elements 206 connected in series (m elements) and in parallel (n elements). The numbers m and n may be selected based on the application, i.e., a surface area or portion of the propeller blade to be heated, voltage, frequency and available power. The matrix 204 may be constructed and arranged in a manner that allows adjustment of the RL heating unit 200 to the given heating demands, surface and parameters of AC power source.

According to at least one embodiment, the RL elements 206 may have opposite polarities (i.e., north polarity or south polarity) with respect to one another in the direction of the series connection (i.e., the m-direction). The alternating polarities (N,S,N,S,N, . . . ) may be achieved by alternating the connections between the terminals of directly neighboring RL elements 206. As illustrated in FIG. 2, for example, each RL element 206 has a first terminal 208 and a second terminal 210. A north-south (N-S) polarity is established between a first RL element 206a and a second RL element 206b by connecting the second terminal 210 of the first RL element 206a to the second terminal 210 of the second RL element 206b. Similarly, a south-north (S-N) polarity is established between the second RL element 206b and a third RL element 206c. In this case, the S-N polarity is established by connecting the first terminal 208 of the second RL element 206b to the first terminal 208 of the third RL element 206c. The alternating polarity (N,S,N,S,N, . . . ) with respect to each neighboring RL element 206 provides closed lines of the magnetic flux between neighboring RL elements 206 and intensive generation of eddy currents in the skin as discussed in greater detail below.

Figure 3:
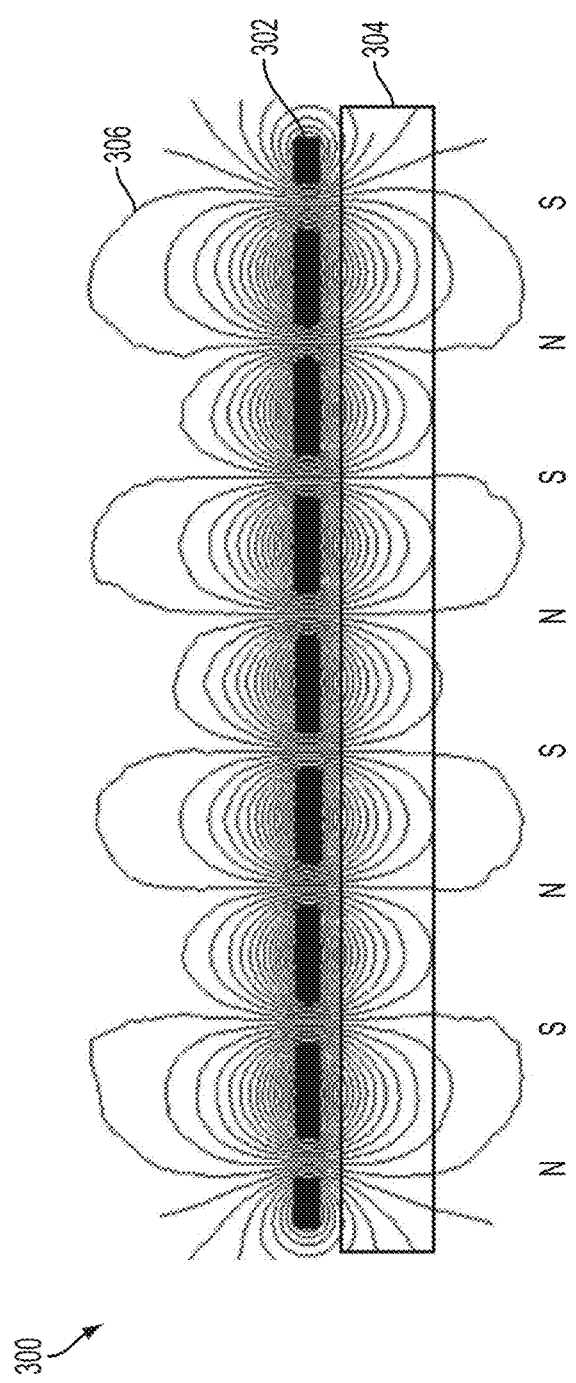
FIG. 3 illustrates a side view of a resistive-inductive heating unit according to an embodiment.

Turning to FIG. 3, an embodiment of an RL heating unit 300 is illustrated, which may be utilized with propeller blades that are formed from an electrically conductive material. The RL heating unit 300 includes individual RL elements 302 formed from a conductive material including, but not limited to, copper and aluminum. In this regard, the RL elements 302 may be disposed directly against one or more portions of a propeller blade 304. The RL elements 302 generate an electromagnetic field 306 that is normal to the propeller blade 304. The electromagnetic field 306 penetrates the propeller blade 304 and induces the flow of eddy currents therein. The RL elements 302 shown in FIG. 3 are arranged to generate alternating magnetic polarities in their series connection, (i.e., N,S,N,S,N,S . . . ). The alternating magnetic polarities provide closed lines of the magnetic flux between neighboring RL elements 302 and intensifies the eddy currents flowing in the skin of the propeller blade 304.

Figure 4:
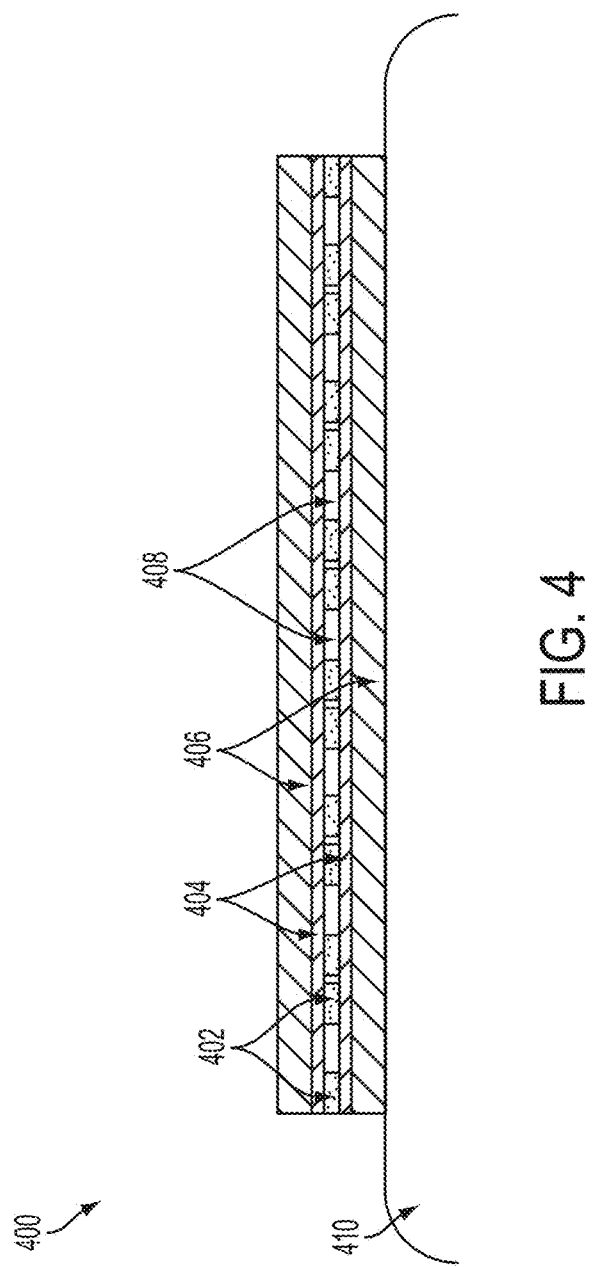
FIG. 4 illustrates a side view of a resistive-inductive heating unit according to another embodiment.
Figure 5:
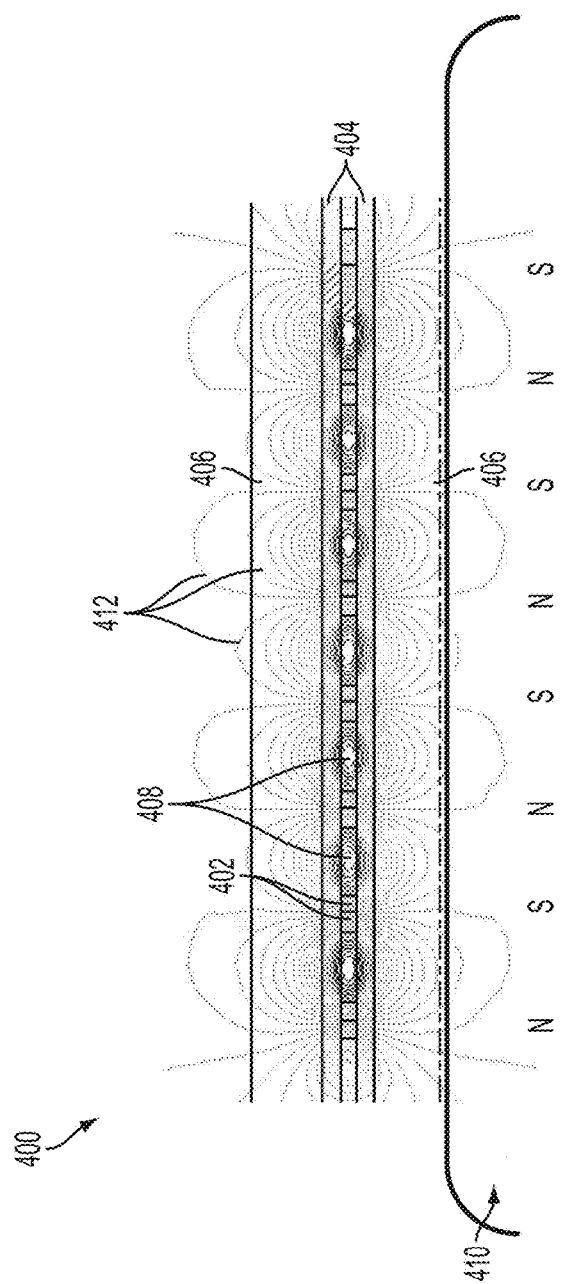
FIG. 5 illustrates a magnetic flux distribution of the resistive-inductive heating unit shown in FIG. 4.

Referring now to FIG. 4, another embodiment of a RL heating unit 400 is illustrated, which may be utilized with propeller blades that are formed from a non-conductive composite material. The RL heating unit 400 includes one or more RL elements 402, a pair of insulating elements 404, and one or more current conducting elements 406. The RL elements 402 are interposed between the insulating elements 404. According to one embodiment, first and second RL elements 402 are paired next to each other. Each pair of RL elements 402 is separated from one another by an air gap 408. The insulating elements 404 isolate the RL elements 402 from the current conducting elements 406. At least one of the current conducting elements 406 is disposed against one or more portions of a respective propeller blade 410. Although FIG. 4 illustrates two current conducting elements 406, it is appreciated that the RL heating unit 400 may include only a single current conducting element 406 which may be disposed against one or more portions of the respective propeller blade 410. Under the action of an alternating magnetic field generated by flowing alternating current through the RL elements 402 having alternating magnetic polarities (i.e., N, S, N, S, . . . ), eddy currents are induced in the current conducting elements 406. Accordingly, the overall heat generated by the RL heating unit 400 is intensified. The corresponding magnetic flux distribution associated with an electromagnetic field 412 generated by the RL elements 402, as obtained from the 2D finite element method (FEM), is illustrated in FIG. 5.

The current conducting elements 406 may be formed from aluminum (Al), for example. Assuming that the frequency of current is f=400 hertz (Hz), the conductivity of current conducting elements, 406, is $\sigma_{Al}=25\times10^6$ S/m, and the magnetic permeability of free space is $\mu_0=0.4\pi\times10^{-6}$ H/m, the equivalent depth of penetration of the electromagnetic field into current conductive element is:

$$\delta = \frac{1}{\sqrt{\pi f \mu_0 \sigma_{Al}}} = \frac{1}{\sqrt{\pi \times 400 \times 0.4 \times \pi \times 10^{-6} \times 25 \times 10^6}} = 5.033 \times 10^{-3} m \approx 5 \text{ mm} \qquad (1)$$

Figure 6:
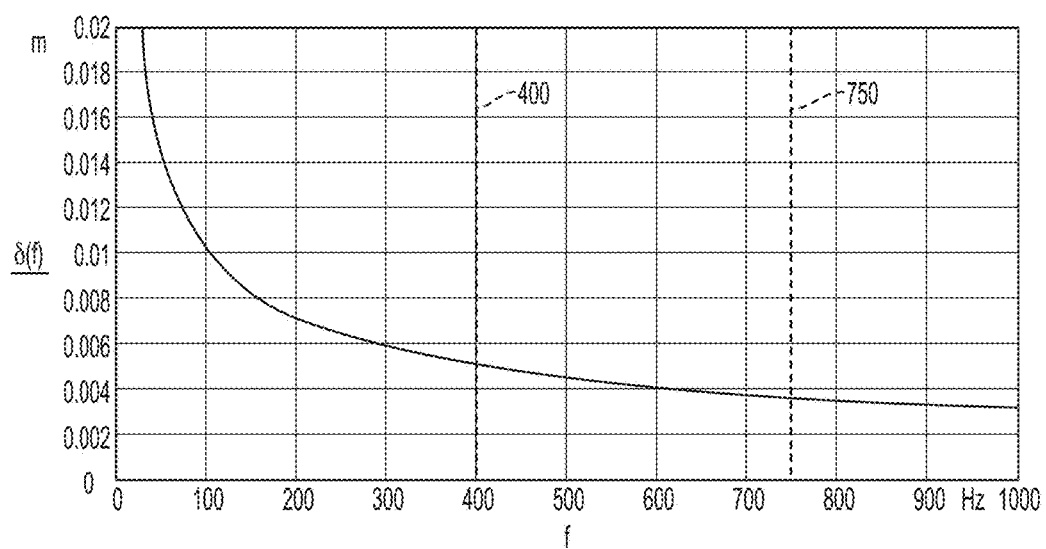
FIG. 6 is a graph plotting a depth of magnetic flux penetration, 5, with respect to frequencies of alternating current (AC) flowing through heating elements included in a resistive-inductive heating unit.

Thus, the surface of the current conductive element 406 is completely penetrated by the 400-Hz electromagnetic field that induces intensive eddy currents in the current conducting elements 406 such that inductive heating is effectively generated. The depth of penetration, δ, for other frequencies of AC current in RL elements 406 is plotted in FIG. 6. Even at the input frequency f=1000 Hz and higher, a 1.5 millimeters (mm) thick current conducting element 406 is completely penetrated by the electromagnetic field.

Still referring to FIG. 5, each RL element 402 is arranged to generate alternating magnetic polarities (i.e., N,S,N,S,N, S . . . ) in the series-connection direction (i.e., the m-direction) such that closed lines of the magnetic flux between neighboring elements and intensive generation of eddy currents are induced within the current conducting element 406. In this regard, the RL heating unit 400 may provide sufficient thermal power to de-ice the propeller blades 410, while minimizing "runback" of melted ice. Accordingly, downstream un-heated regions of the de-iced propeller blade surfaces may remain ice-free.

The power required to heat a desired area of one or more propeller blades may be determined according to various thermodynamic equations known to those ordinary skilled in the art. According to one example, the free-convection (or natural convection) heat transfer coefficient for air is assumed as $\alpha_0$=25 W/(m² K), coefficient of air stream is assumed as $c_a$=1.0, temperature rise on the blade's surface is assumed as $\Delta\theta$=50° Celsius (° C.) (from −45° C. to 5° C.), the surface of the blades to be heated is assumed as $\Delta S$=1.0 m², and the linear velocity of the rotating propeller blades with respect to the air is assumed as v=532 km/h (both the velocity of the aircraft and the relative velocity of the rotating propeller blades are included). The thermal resistance, $R_{th}$, in Kelvin per Watt (K/W) may then be calculated as:

$$R_{th} = \frac{1}{\alpha_0(1 + c_a\sqrt{v})\Delta S} = \frac{1}{25.0 \times \left(1 + 1.0\sqrt{\frac{532}{3.6}}\right) \times 1.0} = 3.041 \times 10^{-3} \text{ K/W}. \quad (2)$$

Based on the calculated $R_{th}$, the power converted into heat (thermal flux), $P_h$, is calculated as:

$$P_h = \frac{\Delta\theta}{R_{th}} = \frac{50}{3.041 \times 10^{-3}} = 16441.74 \text{ W}. \quad (3)$$

The resulting power, $P_h$, may be delivered by an alternating current (AC) source to heat up a 1 (meter) m² of the surface of the propeller blade. The phase current, $I_{ph}$, delivered by a three-phase AC source 115/200 V, 400 Hz, power factor=0.8 is:

$$I_{ph:} = \frac{16441.74}{3 \times 115 \times 0.8} = 59.572 \text{ A}. \quad (4)$$

This condition can be met if the RL element inductance is, e.g., $L_{ph}$=0.46 mH and its resistance is $R_{ph}$=1.55 ohms (Ω). After simple calculations, one will get the modulus of impedance, $Z_{ph}$=1.934Ω, power factor=0.802, phase current $I_{ph}=V_{ph}/Z_{ph}$=59.472 amperes (A) and dissipated power $3I_{ph}^2R^2$=16,450 kW, which is very close to the calculated vale of $P_h$ given by equation (3).

Figure 7:
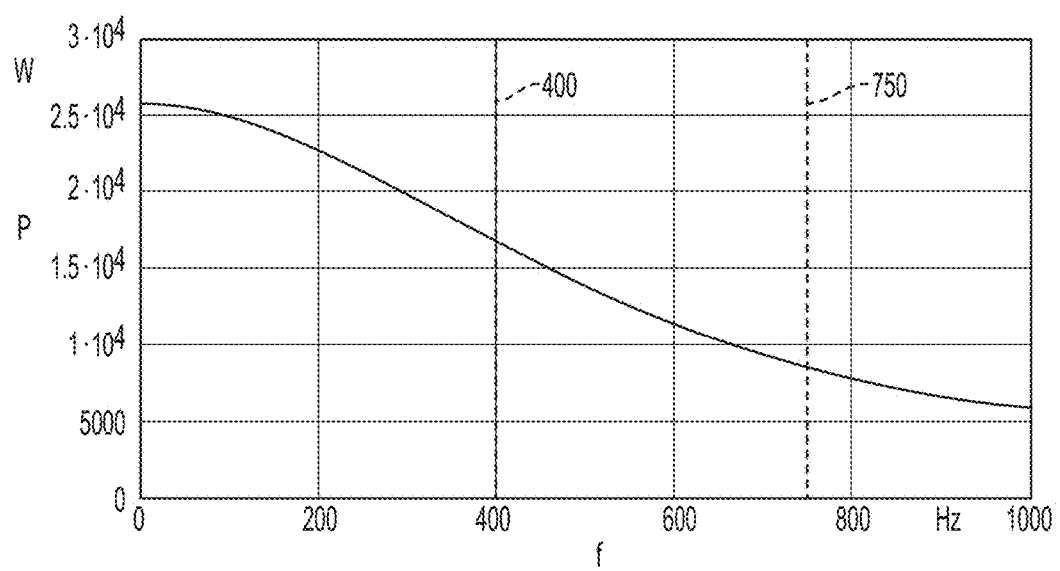
FIG. 7 is a graph plotting power demand per 1 square meter of heating elements as a function of frequency.
Figure 8:
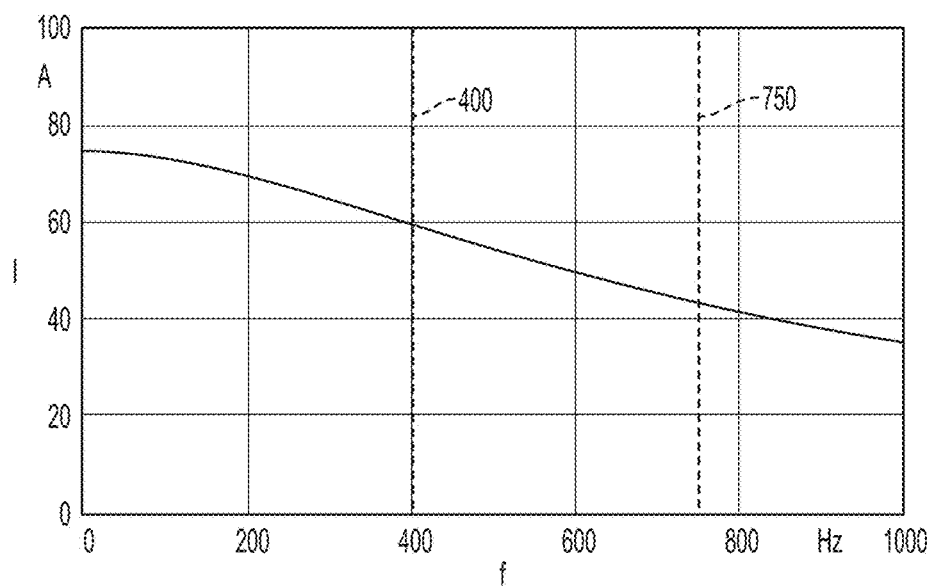
FIG. 8 is a graph plotting phase current per 1 square meter of three-phase heating elements as a function of frequency.

The power consumption and current given by equations (3) and (4) is per 1 m² of surface of propeller blade. If the number of propeller blades is, 8, for example, and the area of a single blade covered with RL elements is 700 mm×70 mm=49,000 mm²=0.049 m², the total surface to be heated is 8×0.049 m²=0.392 m². The power demand for an 8-blade propeller assembly, for example, is therefore 0.049×16,450 W=6447 W. The power consumption and current per square meter for other frequencies is represented in the graphs illustrated in FIGS. 7-8, respectively.

The power consumption may reach, for example, approximately 6.5 kW, but must be delivered to the propeller blades across an air gap that separates the prop unit 104 from the engine housing 102. Therefore, the power must be transferred to the RL heating unit 400 using a contactless power transfer (CPT) system. A CPT system according to various embodiments of the inventive teachings is configured to control both electrical power flow and magnetic flux in the RL heating unit 400.

Figure 9:
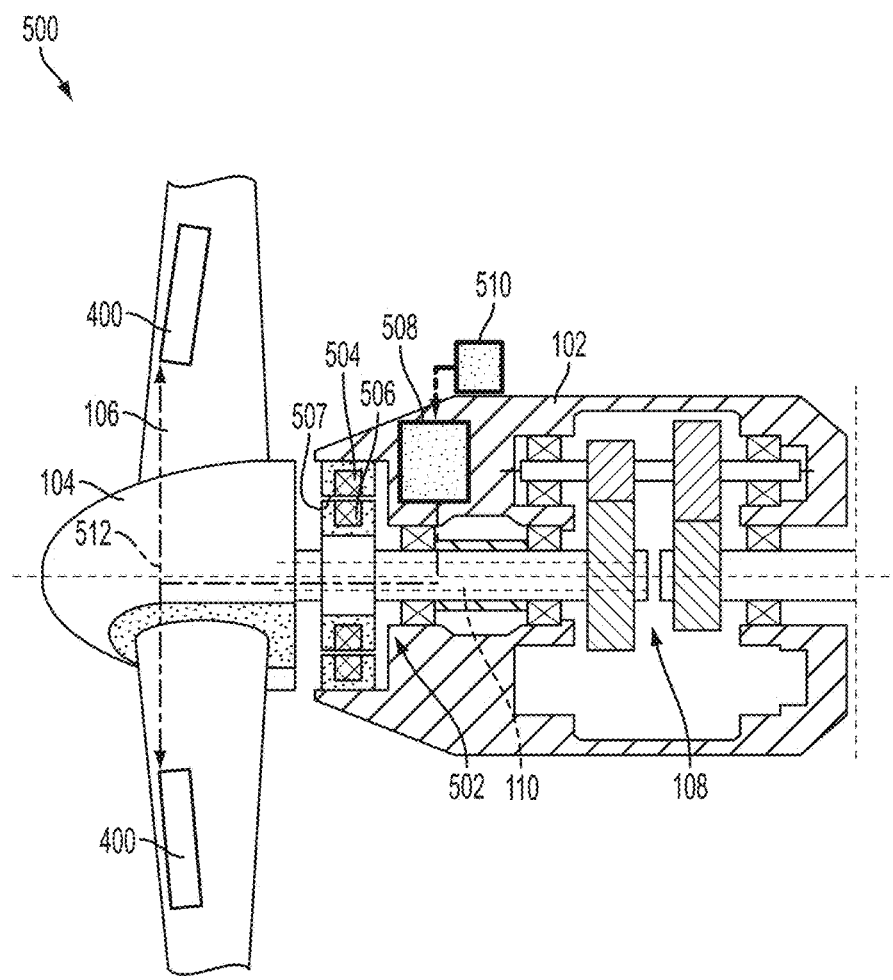
FIG. 9 is a cross-sectional view of a contactless power transfer propeller system including a rotary transformer configured to transfer power across an air gap according to an embodiment.

Referring to FIG. 9, a CPT propeller system 500 configured to transfer power across an air gap is illustrated according to an embodiment. The CPT system 500 shown in FIG. 9 includes a rotary transformer 502. The rotary transformer 502 includes a primary winding 504 and a secondary winding 506. An engine assembly 108 is disposed in an engine housing 102. The engine assembly 108 drives a propeller shaft 110, which ultimately rotates the prop assembly 104 along with the propeller blades 106.

The primary winding 504 is disposed on a stationary portion of the engine housing 102 and is electrically connected to a power control module (PCM) 508. The PCM 508 generates current that flows through the primary winding 504, which induces an electromagnetic field as understood by those ordinarily skilled in the art. According to at least one embodiment, one or more sensors 510 may determine one or more environmental conditions. The environmental conditions may include, but are not limited to, ambient air temperature and pressure, ambient air humidity, exterior surface temperature of the aircraft, airflow velocity, aircraft velocity and ambient precipitation. In response to receiving the environmental conditions from the sensor 510, the PCM 508 may generate power that induces alternating current flow through the primary winding 504. The alternating current may have a frequency, 10 kilohertz (kHz) or more.

Figure 10:
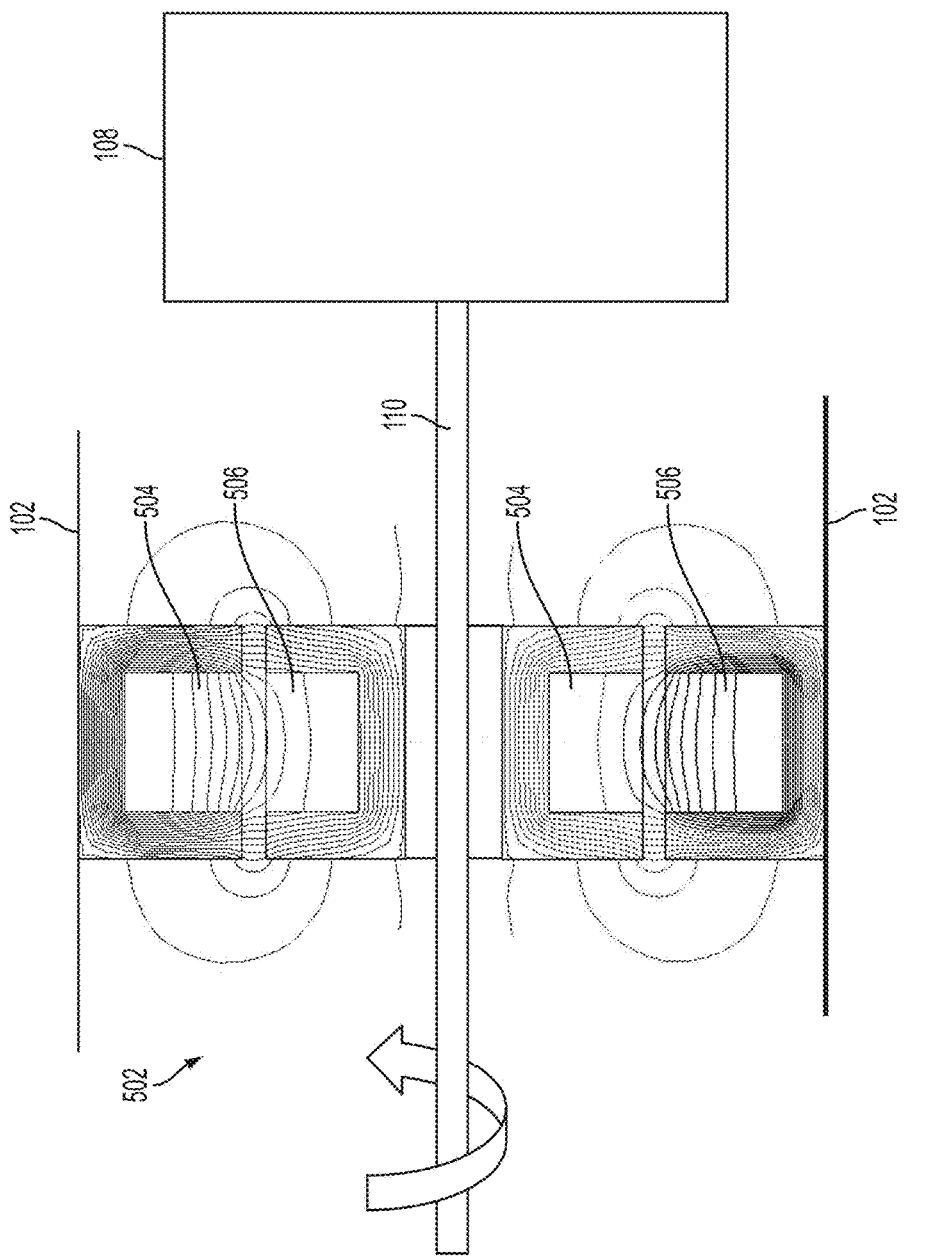
FIG. 10 illustrates an electromagnetic flux distribution during operation of the rotary transformer shown in FIG. 9.

The secondary winding 506 is coupled to the propeller shaft 110 and is separated from the primary winding 504 via an air gap 507. The secondary winding 506 is configured to rotate with respect to the primary winding 504 as the engine assembly 108 drives the propeller shaft 110. The RL elements 400 may be electrically connected to the secondary winding 506 using electrically conductive wires 512 disposed in the hollows of the propeller shaft 110. While rotating, the secondary winding 506 realizes the electromagnetic field generated by the primary winding 504 such that an AC current is induced in the secondary winding 506. The AC current flow is delivered to the RL heating units 400, which initiates the resistive and inductive heating processes described in detail above. The electromagnetic flux distribution during operation of the rotary transformer 502 is illustrated in FIG. 10.

Figure 11:
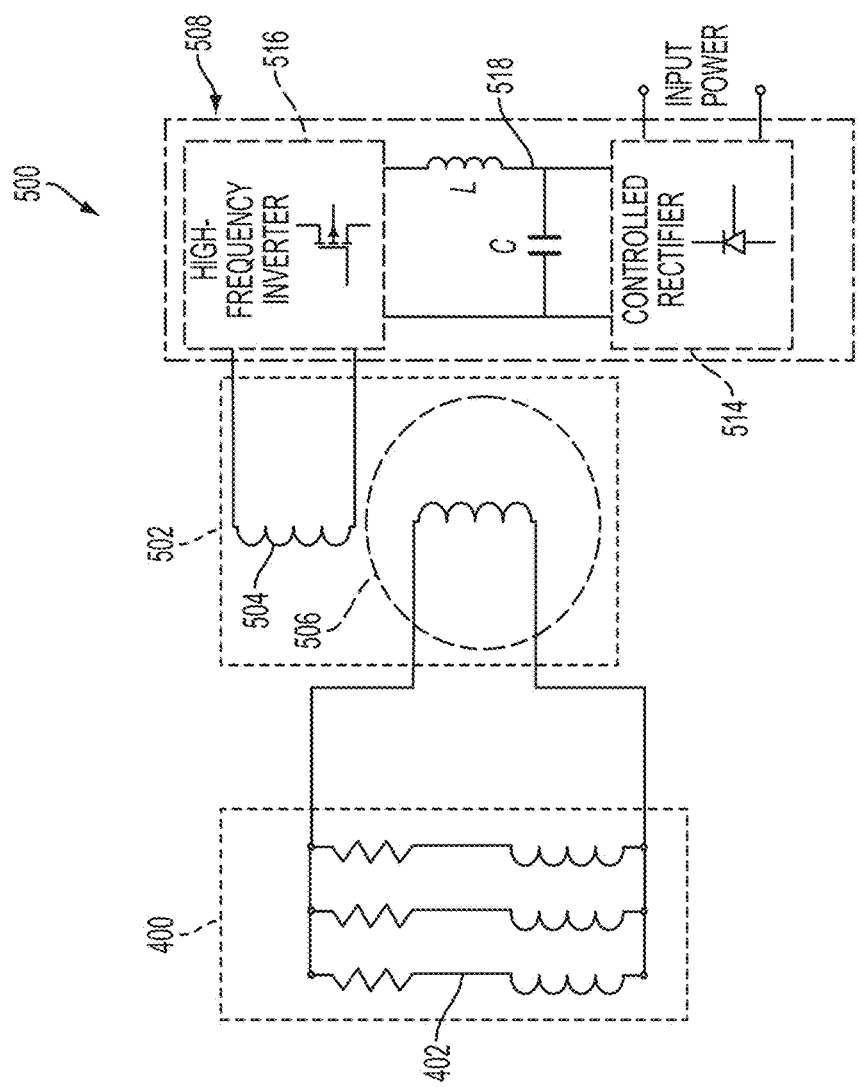
FIG. 11 is an electrical schematic diagram of a contactless power transfer propeller system including a rotary transformer according to an embodiment.

Turning to FIG. 11, an electrical schematic diagram of a CPT propeller system 500 including a rotary transformer 502 is illustrated according to an embodiment. The rotary transformer 502 includes a primary winding 504 in electrical communication with a PCM 508, and a secondary winding 506 in electrical communication with an RL heating unit 400. The PCM 508 includes a controlled rectifier 514 and a frequency inverter unit 516. A filter 518 may be interposed between the controlled rectifier 514 and the frequency inverter unit 516. The RL heating unit 400 may include a plurality of RL elements 402 connected in a parallel with the secondary winding 506.

Figure 12:
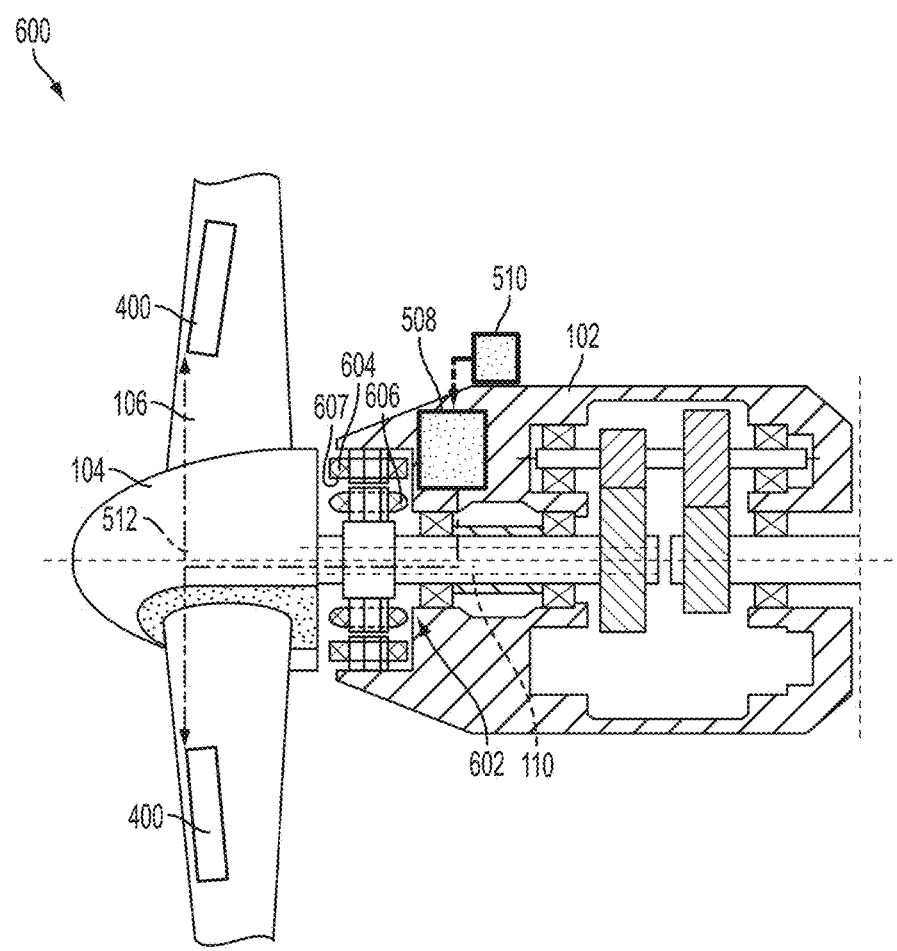
FIG. 12 is a cross-sectional view of a contactless power transfer propeller system including a wound field synchronous generator configured to transfer power across an air gap according to an embodiment.

Referring now to FIG. 12, a CPT propeller system 600 configured to transfer power across an air gap is illustrated according to another embodiment. The CPT system 600 shown in FIG. 12 includes a wound field synchronous generator 602. The wound field synchronous generator 602 includes a field excitation winding 604 and an armature winding 606. An engine assembly 108 is disposed in an engine housing 102. The engine assembly 108 drives a propeller shaft 110, which ultimately rotates the prop assembly 104 along with the propeller blades 106.

The field excitation winding 604 is disposed on a stationary portion of the engine housing 102 and is electrically connected to a PCM 508. The PCM 508 generates current that flows through the field excitation winding 604, which induces an electromagnetic field as understood by those ordinarily skilled in the art. According to at least one embodiment, one or more sensors 510 may determine one or more environmental conditions. The environmental conditions may include, but are not limited to, ambient air temperature, exterior surface temperature of the aircraft, airflow velocity, aircraft velocity, air density, and precipitation. In response to receiving the environmental conditions from the sensor 510, the PCM 508 may generate a power signal that induces direct current (DC) through the field excitation winding 604.

Figure 13:
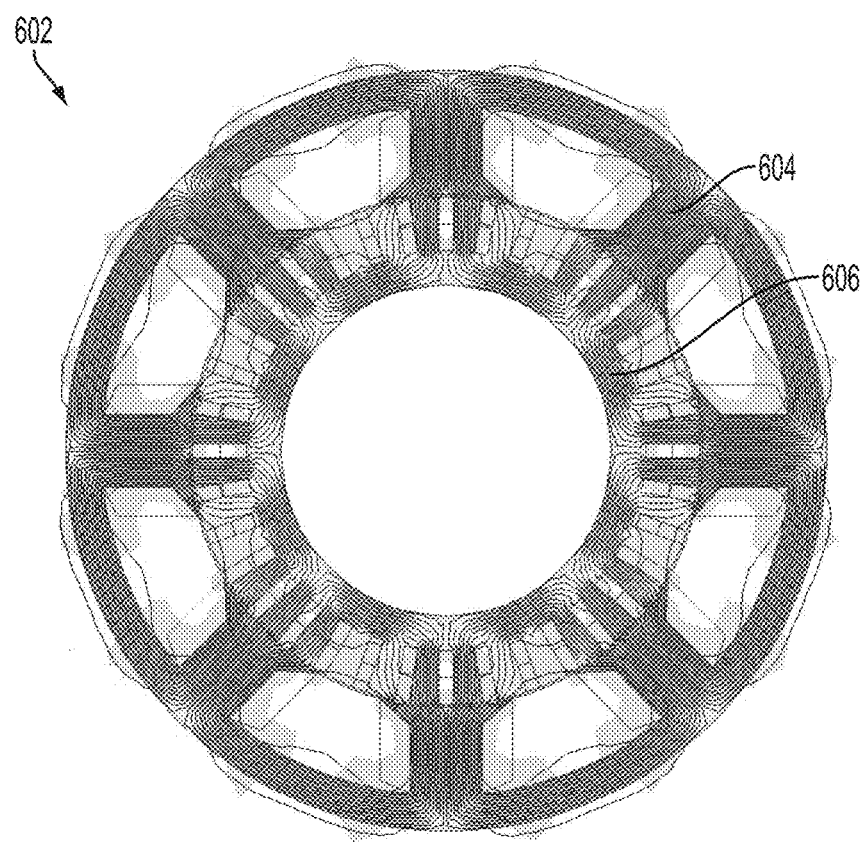
FIG. 13 illustrates an electromagnetic flux distribution during operation of the wound field synchronous generator shown in FIG. 12.

The armature winding 606 is coupled to the propeller shaft 110 and is separated from the field excitation winding 604 via an air gap 607. The armature winding 606 is configured to rotate with respect to the field excitation winding 604 as the engine assembly 108 drives the propeller shaft 110. The RL elements 400 may be electrically connected to the armature winding 606 using electrically conductive wires 512 disposed in the hollows of the propeller shaft 110. While rotating, the armature winding 606 is excited by the rotor electromagnetic field and generates an AC current as understood by those ordinarily skilled in the art. The AC current flow is delivered to the RL heating units 400, which initiate generation of the resistive and inductive heating operations as described in detail above. The electromagnetic flux distribution during operation of the wound field synchronous generator 602 is illustrated in FIG. 13.

Figure 14:
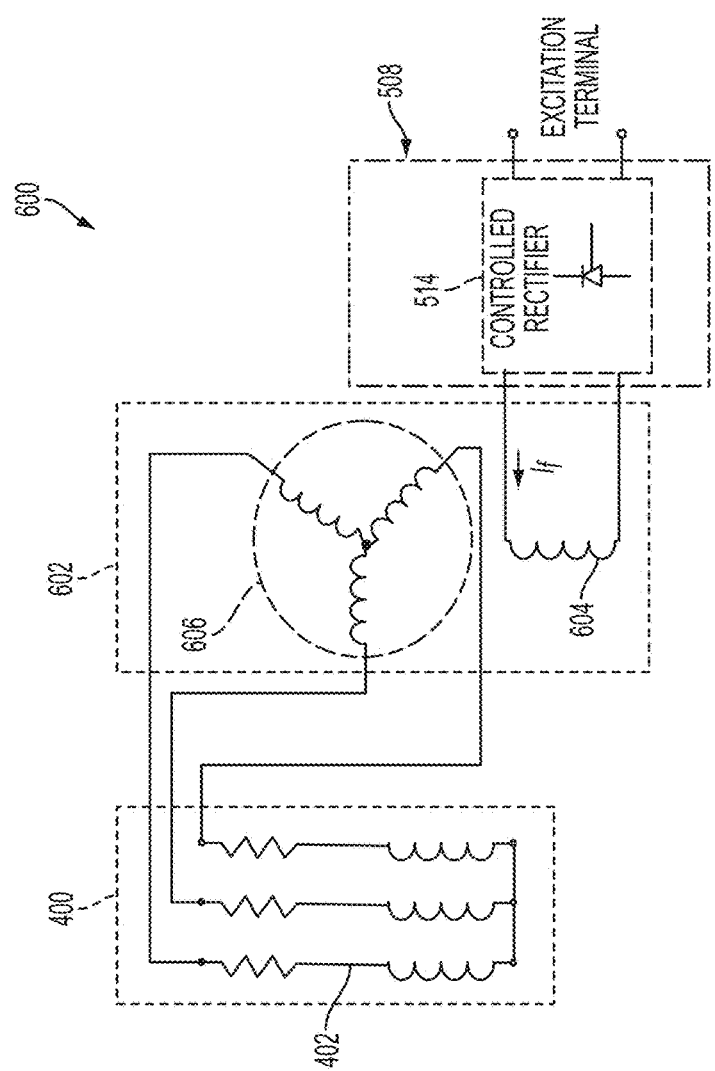
FIG. 14 is an electrical schematic diagram of a contactless power transfer propeller system including a wound field synchronous generator according to an embodiment.

Turning to FIG. 14, a schematic diagram of a CPT propeller system 600 including a wound field synchronous generator 602 is illustrated according to an embodiment. The rotary transformer 602 includes a field excitation winding 604 in electrical communication with a PCM 508, and an armature winding 606 in electrical communication with an RL heating unit 400. The PCM 508 includes a controlled rectifier 514. The RL heating unit 400 may include a plurality of RL elements 402 connected in a parallel with the armature winding 606. According to at least one embodiment, the armature winding 606 includes a three-phase Y-connected winding that generates an AC current in response to rotating in the presence of the electromagnetic field generated by the field excitation winding 604. It is appreciated, however, that the armature winding 606 may be formed according to different connections including, but not limited to, a single-phase connection and a polyphase connection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft propeller de-icing system comprising:
   at least one propeller blade coupled to a rotatable prop assembly, the prop assembly configured to rotate in response to rotatably driving a propeller shaft;
   at least one resistive-inductive heating unit coupled to the at least one propeller blade, the resistive-inductive heating unit configured to generate eddy currents that induce inductive heat in response to an electric current; and
   a contactless power transfer system that generates electrical current in response to transferring power across an air gap separating the propeller shaft from the contactless power transfer system,
      wherein the contactless power transfer system includes a rotary transformer, the rotary transformer comprising:
   a primary winding coupled to a stationary portion of the aircraft and configured to generate an electromagnetic field in response to an alternating excitation current;
   a secondary winding separated from the primary winding via the air gap and configured to rotate about the primary winding; and
   a power control module configured to generate alternating excitation current to the primary winding, the secondary winding generating the electrical current that is delivered to a plurality of electrically conductive resistive-inductive elements of the resistive-inductive heating unit in response to realizing the electromagnetic field.

2. The aircraft propeller de-icing system of claim 1, wherein the contactless power transfer system further comprises at least one sensor that determines at least one environmental condition, and wherein the power control module generates the alternating excitation current in response to determining the at least one environmental condition.

3. The aircraft propeller de-icing system of claim 1, wherein the plurality of electrically conductive resistive-inductive elements generates an electromagnetic field in response to the electrical current, the electromagnetic field inducing the eddy currents that generate the inductive heat.

4. The aircraft propeller de-icing system of claim 3, wherein the plurality of electrically conductive resistive-inductive elements are formed on a flexible substrate and arranged in a matrix configuration.

5. The aircraft propeller de-icing system of claim 4, wherein the resistive-inductive heating unit includes a pair of insulating elements, and wherein the plurality of electrically conductive resistive-inductive elements are interposed between the insulating elements; and
   at least one current conducting element isolated from the plurality of resistive-inductive elements and disposed against one or more portions of a respective propeller blade,
   wherein the eddy currents are generated in the at last one current conducting element to generate the inductive heat.

6. The aircraft propeller de-icing system of claim 5, wherein the matrix configuration of the plurality of electrically conductive resistive-inductive elements includes an m x n matrix, wherein m resistive-inductive elements are connected in series and n resistive-inductive elements are connected in parallel.

7. The aircraft propeller de-icing system of claim 6, wherein the plurality of electrically conductive resistive-inductive elements connected in series have an alternating magnetic polarity with respect to one another, the magnetic polarity intensifying the eddy currents flowing through the at last one current conducting element.

8. The aircraft propeller de-icing system of claim 7, wherein the contactless power transfer system includes a wound field synchronous generator, the wound field synchronous generator comprising:
   a field excitation winding coupled to a stationary portion of the aircraft and configured to generate an electromagnetic field in response to a direct current;

an armature winding separated from the field excitation winding via the air gap and configured to rotate about the field excitation winding; and a power control module configured to generate the direct current to the a field excitation winding, the armature winding generating the electrical current that is delivered to the plurality of resistive-inductive elements in response to realizing the electromagnetic field.

9. The aircraft propeller de-icing system of claim 8, wherein the armature winding includes a three-phase armature winding that generates an alternating current to the plurality of resistive-inductive elements.

10. The aircraft propeller de-icing system of claim 9, wherein the contactless power transfer system further comprises at least one sensor that determines at least one environmental condition, and wherein the power control module generates the direct current in response to determining the at least one environment condition.

11. A resistive-inductive heating unit configured to de-ice at least one aircraft propeller blade, the resistive-inductive heating unit comprising:

a current conducting element disposed on the at least one propeller blade;

a first insulating element disposed on the current conducting element;

at least two pairs of resistive-inductive elements disposed on the first insulating element;

a second insulating element disposed on the at least two pairs of resistive-inductive elements, the at least two pairs of resistive-inductive elements interposed between the first and second insulating elements and electrically insulated from the current conducting element wherein the at least two pairs of resistive-inductive elements generate an electromagnetic field in response to an electrical current, the electromagnetic field inducing eddy currents in the current conducting element to generate inductive heat that heats the at least one aircraft propeller blade, wherein the contactless power transfer system includes a rotary transformer, the rotary transformer comprising:

a primary winding coupled to a stationary portion of the aircraft and configured to generate an electromagnetic field in response to an alternating excitation current;

a secondary winding separated from the primary winding via the air gap and configured to rotate about the primary winding; and a power control module configured to generate alternating excitation current to the primary winding, the secondary winding generating the electrical current that is delivered to a that at least two pairs of resistive-inductive elements in response to realizing the electromagnetic field.

12. The resistive-inductive heating unit of claim 11, wherein each pair of resistive-inductive heating elements is separated from one another by an air gap.

13. The resistive-inductive heating unit of claim 12, wherein the current conducting element is formed from aluminum.

14. The resistive-inductive heating unit of claim 13, wherein a first pair of resistive-inductive elements generates a first magnetic polarity and a second pair of resistive-inductive elements generates a second magnetic polarity that is opposite from the first magnetic polarity.

* * * * *